UNITED STATES PATENT OFFICE.

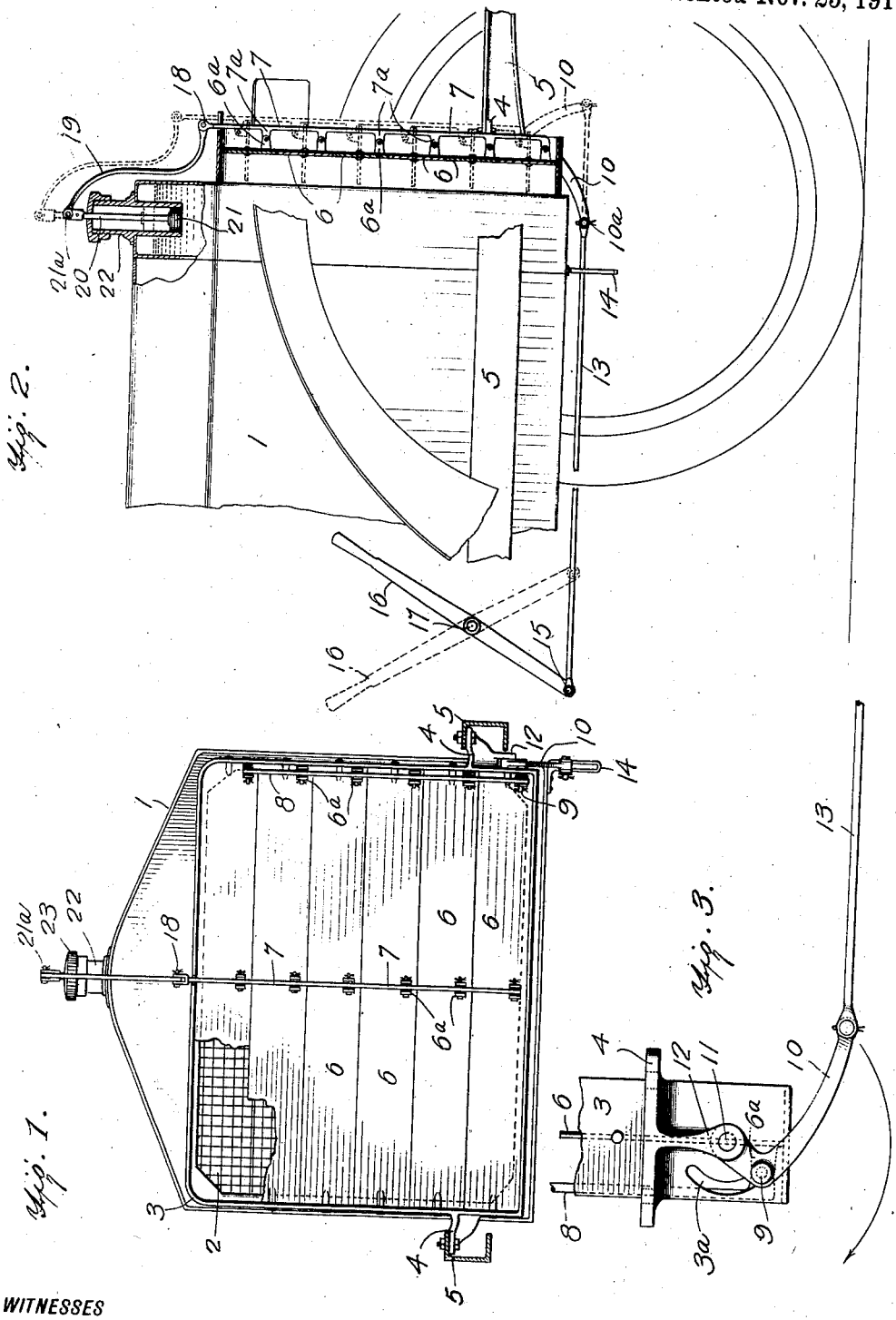

ALBERT HOILAND, OF NOME, NORTH DAKOTA.

WIND-SHIELD FOR AUTOMOBILE-RADIATORS.

1,079,765.

Specification of Letters Patent.   Patented Nov. 25, 1913.

Application filed June 17, 1912.   Serial No. 704,148.

*To all whom it may concern:*

Be it known that I, ALBERT HOILAND, a citizen of the United States, and a resident of Nome, in the county of Barnes and State of North Dakota, have made certain new and useful Improvements in Wind-Shields for Automobile-Radiators, of which the following is a specification.

My invention relates to improvements in wind shields for automobile radiators, and it consists in the combinations, constructions, and advantages herein described and claimed.

An object of my invention is to provide a device which may be operated either by hand or automatically for shielding the radiator from the wind and therefore conserving the heat necessary to bring the engine to the best working temperature.

A further object of my invention is to provide a comparatively simple device which can be cheaply manufactured for accomplishing the above named result.

Other objects and advantages will appear in the following specification, and the novel features of the device will be particularly pointed out in the appended claims.

My invention is illustrated in the accompanying drawings forming part of this application in which—

Figure 1 is a front view of a radiator provided with my invention, Fig. 2 is a side view of the device, and Fig. 3 is a detail view of the operating lever.

In carrying out my invention I may make use of an automobile 1 of any approved type having a radiator 2. Immediately in front of the radiator 2 I secure a shield of the type shown in the drawings. This shield consists of a frame 3 of any suitable material having integral side arms 4 arranged to be attached to the side members 5 of the vehicle frame. Within the frame are pivotally secured a number of slats 6 having lugs 6ª (see Fig. 2) which project forwardly and to which are pivotally connected the lugs 7ª of a common operating rod 7. A rod 8 at one end of the row of slats is connected to each slat in the same manner as the rod 7. The lower end of this rod 8 is pivotally connected at 9 to a lever 10, which is hinged at 11 between the frame 3 and a downwardly projecting lug 12 on the arm 4 (see Figs. 1 and 3). The pivot pin 9 extends through a slot 3ª in the frame 3, this slot being concentric about the pivot 11, so that the pin 9 slides and is guided therein. The lever 10 is connected by means of a link 13, which passes through a guide member 14, and is in turn pivotally connected at 15 to a hand lever 16, pivoted at 17, and in easy reach of the operator of the vehicle. The rod 7 is pivotally connected at 18 with a curved rod 19, leading to a pivotal connection with the piston rod 20 of the piston 21, which is disposed in the cylinder 22. The latter constitutes in fact the means for filling the water jacket of the radiator with water, and is provided with a screw cap 23 through which the piston rod slides.

From the foregoing description of the various parts of the device the operation thereof may be readily understood.

It is a well known fact that in cold weather it is sometimes difficult to get an engine into the best running condition because of the fact that the radiator cools off the water and allows the heat of the engine to escape, thus it may take some time before the engine gets up to the proper running temperature. This device forms a shield so as to protect the radiator from the cold air. Thus when the lever 16 is in the full line position the lever 10 is held so that the pivoted slats 6 are in alinement and the blinds are therefore closed. When the engine is sufficiently heated, the lever 16 may be pulled to its dotted line position and the rod 8 will be swung upwardly, thereby bringing the slats into the dotted line position shown in Fig. 2 and permitting the air to have access to the radiator. This is the manual means of operating the device. I have made provision for the automatic operation of the device, which consists of the cylinder 22 having the piston 21 therein. The radiator is filled by disconnecting the link 19 from the piston rod at 21ª, removing the cap, and withdrawing the piston, when water may be poured in so as to fill the radiator to the desired height. When the piston is placed in position and connected, if the wind shield be closed, the piston will assume the position shown in Fig. 2. Now as the water becomes heated it will expand and cause the piston to rise. This will tend to raise the rod 7 and will open the shield to permit the entrance of the air. It will thus be seen that I can operate the wind shield either manually or automatically.

Either the manual means and the automatic operating means may be used together as described, or either may be used separately. Thus the manual means may be used alone by disconnecting the rod 19, either at its pivotal connection 18 with the rod 7, or at its pivotal connection 21ᵃ with the piston rod 20. Similarly the automatic means may be used alone if desired by disconnecting the lever 10 at its pivotal connection 10ᵃ with the rod 13. The manual means for operating the wind shield is especially desirable in the case of a leaky radiator where the automatic means cannot be used.

I claim:

1. The combination with an automobile radiator having a water jacket, of a wind shield therefor comprising a frame, a series of slats pivotally mounted within said frame and arranged to be brought into alinement, means operated by the expansion of the water in the radiator jacket for automatically rotating the slats to expose the radiator, additional means for manually operating the slats, said automatic means comprising a cylinder having one end open and projecting into the water jacket of the radiator, a piston in said cylinder having a piston rod projecting through the end of the cylinder into the open end, a common rod pivotally connected to all of the slats, and a connection between the end of said common rod and the end of the piston rod.

2. The combination with an automobile radiator having a water jacket, of a wind shield therefor comprising a frame, a series of slats pivotally mounted within said frame and arranged to be brought into alinement, means operated by the expansion of the water in the radiator jacket for automatically rotating the slats to expose the radiator, additional means for manually operating the slats, said automatic means comprising a cylinder having one end open and projecting into the water jacket of the radiator, a piston in said cylinder having a piston rod projecting through the end of the cylinder into the open end, a common rod pivotally connected to all of the slats, a connection between the end of said common rod and the end of the piston rod, said manual means comprising a second common rod pivotally connected to all of the slats, a lever for moving said second common rod, a link pivotally connected to one end of said lever, and an operating lever pivotally connected to said link.

ALBERT HOILAND.

Witnesses:
ALFRED AAMOTH,
JOHN HOILAND.